INVENTOR
HERBERT E. RUEHLEMANN
BY
Caesar, Rivise, Bernstein & Cohen
ATTORNEYS.

Oct. 29, 1968 H. E. RUEHLEMANN 3,408,452

ELECTRICAL INTERCONNECTOR FORMED OF INTERCONNECTED STACKED MATRICES

Filed Oct. 1, 1965 3 Sheets-Sheet 2

INVENTOR
HERBERT E. RUEHLEMANN
BY
Caesar, Rivise, Bernstein & Cohen
ATTORNEYS.

INVENTOR
HERBERT E. RUEHLEMANN
BY
Caesar, Rivise, Bernstein & Cohen
ATTORNEYS.

United States Patent Office 3,408,452
Patented Oct. 29, 1968

3,408,452
ELECTRICAL INTERCONNECTOR FORMED OF INTERCONNECTED STACKED MATRICES

Herbert E. Ruehlemann, Huntingdon Valley, Pa., assignor to Elco Corporation, Willow Grove, Pa., a corporation of Pennsylvania Filed Oct. 1, 1965, Ser. No. 492,164
7 Claims. (Cl. 174—68.5)

ABSTRACT OF THE DISCLOSURE

A matrix of electrical interconnectors comprises a plurality of sheets of insulating material with each sheet having a conductive grid on one surface thereof. The conductive grid on each sheet is comprised of two groups of conductors, the conductors of one group intersecting the conductors of the other group at a plurality of electrical junctions. Each conductive grid is separated from an adjacent conductive grid by one of the sheets of insulating material, and at least two of said grids in the matrix are electrically interconnected by a bonded junction between said at least two of said grids at vertically aligned electrical junctions.

This invention relates to an electrical interconnector, and more particularly, a method and device for forming a multitude of electrical circuits particularly adapted for back-panel wiring.

All electronic circuitry consists of discrete components interconnected in such a manner as to create a functional device. In its simplest form this may consist of two or more parts joined by an electrical conductor. As the electronic systems have grown in complexity, the number of interconnections has also increased.

The device and method of this invention provide an economical and efficient solution to the multiple interconnection problem.

The first and most common method of electrical interconnection is that of hand wiring. This technique interconnects two or more points electrically and physically with wire. The actual termination of the wire is accomplished in many ways, such as soldering, wire-wrapping, welding or crimping.

Another commonly used method of electrical interconnection is that of printed circuitry. In this method the interconnections are accomplished through the use of conductors whose physical geometry is pre-determined and carried out through the use of photographic and chemical methods.

All of the hand wiring and printed circuit techniques now in use possess a number of disadvantages. With respect to the hand wire techniques, substantially all systems must be uniquely wired and are thus subject to human error. Additionally, inefficient routing allows excessive build-up and poor utilization of the space available.

A suggester solution to the build-up and space utilization problem of hand wiring has been the hand wire matrix configuration. This comprises at least two planes of a plurality of parallel wires. Each plane comprises an insulating sheet and a plurality of parallel wires secured on the top surface thereof. The next plane comprises a similar insulating sheet and a plurality of parallel wires secured on the top surface. However, when the sheets are stacked to form a matrix, the wires of one plane or sheet are 90° out of phase with the wires of the next adjacent, or upper and lower, sheets or planes. This multi-layer matrix is utilized by electrically connecting a wire of one sheet with a wire on an upper or lower sheet, or the wires on a number of upper and lower sheets, to complete a circuit.

Even though this matrix method does provide a better utilization of space, it also possesses a number of disadvantages. Thus, it has been found that the use of this matrix requires a substantial increase in the number of electromechanical joints as compared to straight hand wire wiring. The overall result is that the use of this matrix technique is essentially the same as point to point wiring with the exception that better utilization of he available space is accomplished.

The disadvantages in the point to point printed circuitry technique, whether single or multi-layer, are that once the art work has been completed, change or modification is difficult, repair is difficult, and only a few of the many termination techniques can be used. In all multi-layer configurations, vertical or interlayer connections must be made thereby increasing the number of electromechanical joints between two given points.

The device of this invention overcomes all of the aforementioned disadvantages of the prior electrical interconnecting media. This is accomplished by providing a matrix of two or more planes with each plane comprising an insulating sheet and an electrically conducting pattern formed on the top surface thereof. This pattern comprises at least two sets of parallel conductive lines with the lines intersecting to form electrical junction points. In use, an electrical circuit can be made in each plane by breaking the conductive lines where circuitry is not desired. In other words, a deletion system is used for programing circuitry.

One advantage of this invention over the hand wiring technique is that actual point to point wiring can be eliminated. The vast number of electromechanical joints required by the prior art matrix is substantially reduced because complete circuits can now be obtained in one plane without the necessity of having two or more planes to complete a circuit. This is because each individual plane of intersecting lines of parallel conductors can be used to form a circuit going in any direction whereas the single parallel conductors could be used in only a unidirectional sense. Any change in direction in the prior matrices had to be accomplished by going vertically from one plane to another. Thus, vertical interconnections are held to a minimum since on a single plane both longitudinal and transverse coordinates for circuitry are presented.

The advantages of the device of this invention are also numerous with respect to the prior printed circuitry. Thus, modification is easily accomplished by the use of varying the program for deleting or punching out portions of the conductor grid. Vertical and interlayer connections can easily be accomplished through a welding technique without the use of the hand wire interconnections needed in many printed circuit board techniques.

A specific use of the matrix of this invention is for back-panel wiring. Thus, this invention is readily adapted for providing circuit interconnections for contact tails passing through the rear of a panel on which the contacts are mounted. The tedious wire wrap techniques are totally unnecessary since a simple welding portion can be used for securement of the matrix to the contact tails. Additionally, complete wiring can be accomplished in a minimum of space.

It is therefore an object of this invention to provide a novel electrical interconnector.

It is another object of this invention to provide an electrical interconnector which is adapted for use in back-panel wiring.

It is a further object of this invention to provide an electrical interconnector which includes a multiplicity of circuits in a minimum of space.

It is a further object of this invention to provide an electrical interconnector on which circuits can be formed by readily deleting unneeded conductors.

It is a further object of this invention to provide a matrix of a plurality of novel electrical interconnectors.

It is a further object of this invention to provide a matrix of a plurality of novel electrical interconnectors whereby said electrical interconnectors can be electrically and mechanically connected within the matrix through the use of a heat and welding technique.

It is a further object of this invention to provide a matrix of a plurality of novel electrical connectors which can be connected for back-panel wiring through the use of a welding technique.

These and other objects of this invention are accomplished by providing an electrical interconnector comprising a sheet of insulating material, said sheet having a conductive grid on one surface thereof, said grid comprising a first plurality of parallel longitudinal conductors passing in a first direction, and a second plurality of longitudinal conductors passing in a second direction and intersecting said first plurality of conductors whereby an electrical junction is formed at each intersection, said conductors and sheet of insulating material being sufficiently resilient so as to have portions thereof readily deleted by punching means without adversely affecting the areas immediately adjacent the punched removed portions.

Other objects and many of the attendant advantages of this invention will be readily appreciated as the same becomes better understood by reference to the following detailed description when considered in connection with the accompanying drawings wherein.

Figures 1, 2:
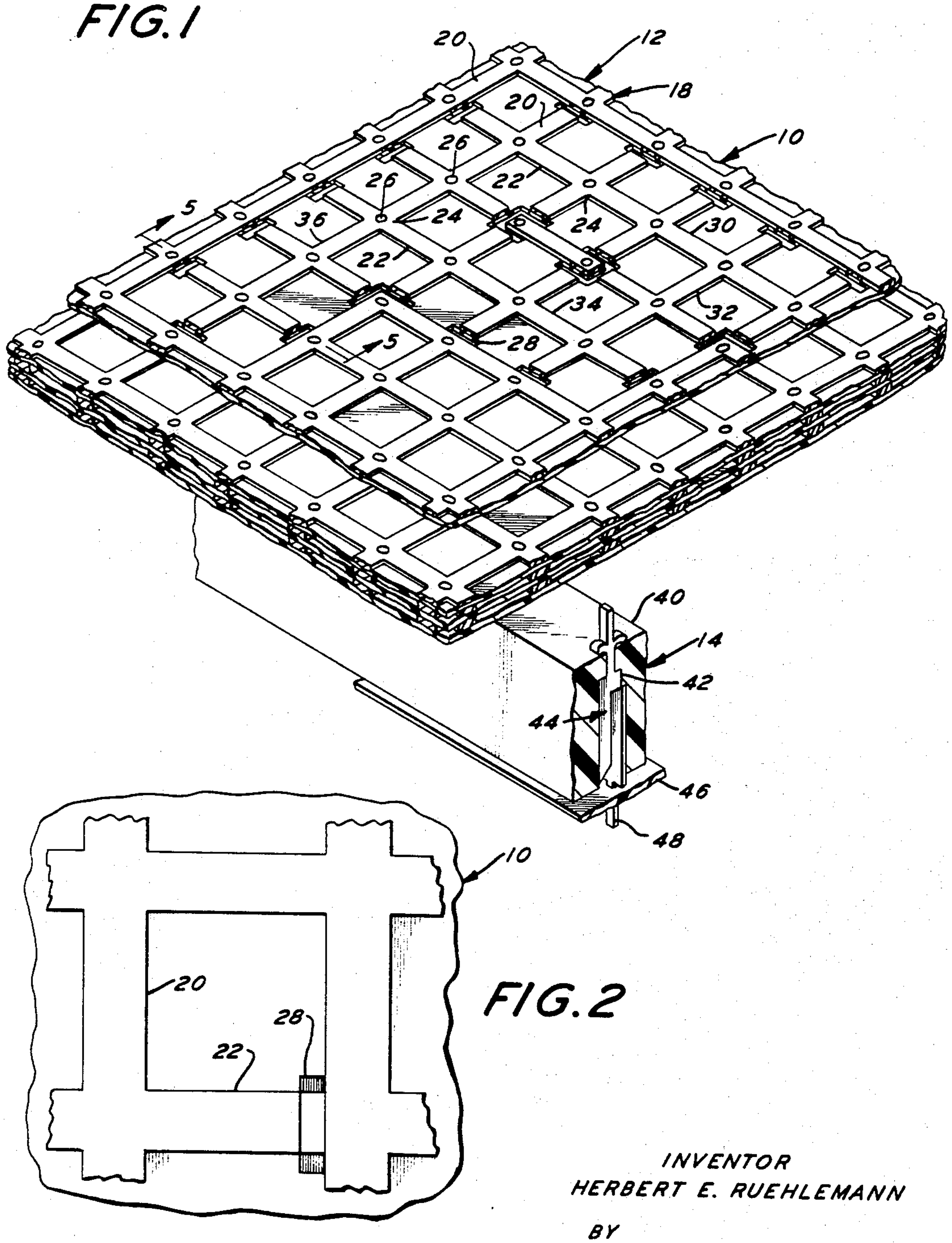
FIG. 1 is an exploded perspective view of the matrix of this invention and an electrical connector adapted for use with this invention.
FIG. 2 is an enlarged top plan view of a portion of the matrix of FIG. 1.
Figure 3:
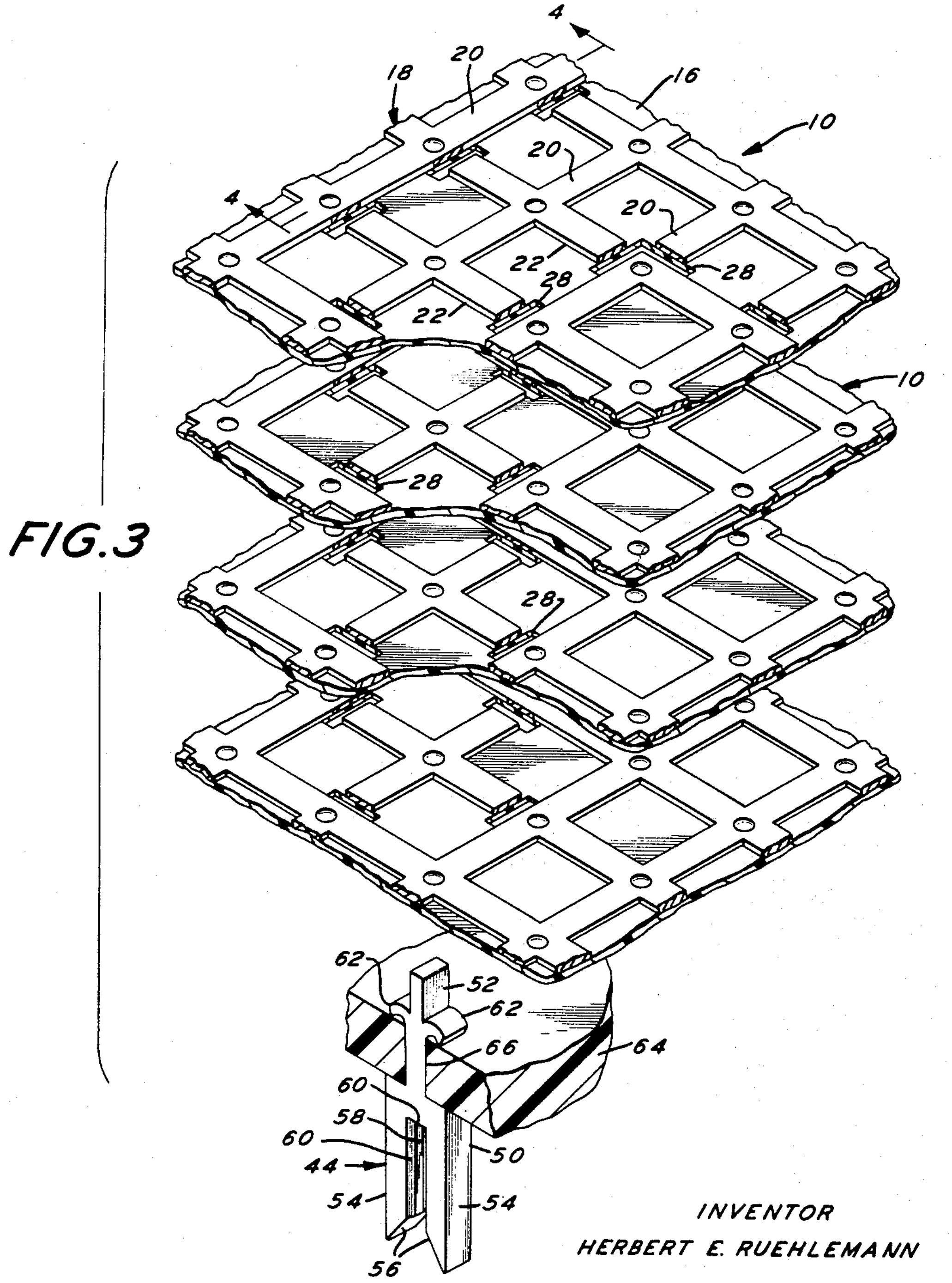
FIG. 3 is an exploded perspective view of a plurality of electrical interconnectors forming the matrix of FIG. 1 and a section of a connector adapted for use with the matrix.

Referring now in greater detail to the various figures of the drawings wherein similar reference characters refer to similar parts, an electrical interconnector embodying the present invention is generally shown at 10 in FIG. 3 In its most common usage, device 10 will be used in a matrix 12 (FIG. 1) in combination with an electrical connector generally shown at 14 in FIG. 1.

As best seen in FIG. 3, device 10 comprises a semi-rigid substrate 16 and an electrically conductive grid 18 on the top surface thereof. Substrate 16 is preferably a sheet of thermoplastic resin of sufficient thickness to possess good electrical insulating properties. In this thickness it will be semi-rigid in that it will be in a form where it will be relatively self-sustaining. A thickness of 4 mils has been found adequate, but this can vary depending upon the resin used. A preferred resin film is mylar polyester film, which is basically a polyethylene terephthalate resin. Other thermoplastic films may be used, such as polyethylene and polypropylene.

Figure 4:
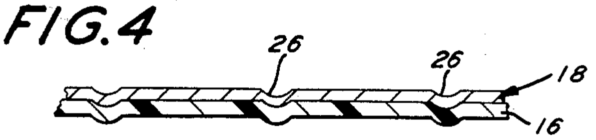
FIG. 4 is a sectional view taken along the line 4—4 of FIG. 3.
Figure 5:
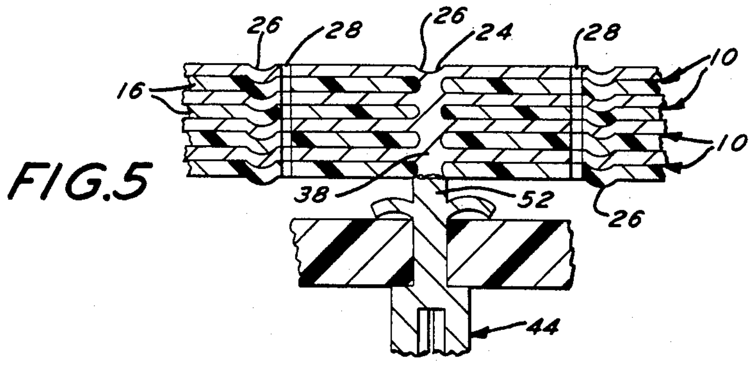
FIG. 5 is an enlarged sectional view taken along the line 5—5 of FIG. 1.

The electrically conductive grid 18 is preferably formed from copper because of copper's conductive properties. However, any electrically conductive material may be used. As seen in FIGS. 1 and 3, grid 18 comprises a first plurality of parallel bands 20 and a second plurality of parallel bands 22 which are perpendicular to the first mentioned bands. The rows of bands 20 and 22 are equally spaced and intersect at junctions 24. As is apparent from the drawing, all of the bands lie in the same plane and are formed of a unitary structure. A depression 26 is formed at each intersection 24. As seen in FIGS. 4 and 5, depressions 26 are carried into substrate 16, for a purpose to be explained hereinafter.

Electrically conductive grid 18 is extremely thin and has a thickness in the order of 1 or 2 mils. The grid is preferably formed from a sheet of copper in which the spaces between bands 22 and 24 are etched out. After the grid has been formed, it is adhesively secured to the film substrate 16. Alternatively, the grid 18 can be pre-heated and pressed into the thermoplastic substrate in order to have it secured in place. Other securement techniques which may be used can include a combination of heat, pressure and adhesive. Another manner of forming the conductive grid would be to print a copper or other electrically conductive material onto the substrate in the same manner as that used for making the printed circuit boards.

Once the grid 18 has been formed on or secured to the substrate 16, the depressions 26 are formed. The purpose for the depressions is to align a plurality of interconnectors 10 when forming matrix 12 shown in FIG. 1. Thus, as seen in FIG. 5, the depressions 26 will interfit, thereby insuring proper alignment of a plurality of interconnectors 10.

As is apparent from FIG. 1, a complete electrical circuit can be formed through interconnector 10 by the intersecting bands forming grid 18. In order to provide for a plurality of individual circuits through each interconnector 10, it is merely necessary to sever a section or sections of grid 18. The most convenient manner of carrying out this severance is through the use of a rectangular punch which would be similar in structure and function to a conventional hole punch for paper. The only difference would reside in the fact that a rectangular punching element rather than a rounded punching element would be used. The copper grid is sufficiently thin and the substrate 16 is sufficiently resilient, yet pierceable, to permit this punching operation. Thus, there is no fear of shattering the grid or the substrate during this punching operation. As seen in FIGS. 1 and 3, various circuits have been delineated through the use of punched holes 28. Thus, each circuit will pass along bands 20 and 22 and be terminated either by the edge of an interconnector 10 or a series of holes 28. For instance, as seen in FIG. 1, a circuit is formed by bands 30, 32, 34 and 36. Various other circuits can be traced in the same manner.

Although hand punching is a convenient method of delineating circuits when only one or a few devices 10 are to be used, whenever an operation will use the same circuitry for a large number of devices, the punching operation can easily be programmed into a gang punch press. Thus, in one operation all unnecessary circuits will be eliminated by the simultaneous punching of all of the desired holes in one device 10. In normal usage, the devices 10 will be used in a stacked arrangement to form the matrix 12. As many as seven, and possibly as many as 10, electrical interconnectors can be used to form a single matrix. As seen in FIG. 3, the circuitry in each interconnector 10 is delineated by the use of punched holes 28.

After the punching operation has been completed, the interconnectors 10 are stacked using depressions 26 as guides. All of the interconnectors 10 forming the matrix are then physically and electrically united through the use of a heat, pressure and welding technique. Thus, once the interconnectors 10 have been stacked, as shown in FIG. 5, electrodes are brought to bear against the top of an uppermost depression 26 and the bottom of an aligned lowermost depression 26. The electrodes are then electrically heated and pressed against the aligned depressions. This causes the melting of the thermoplastic material forming the substrates 16. At the point where the substrates have been melted, their respective grids will be physically contacting each other. Thereafter, a condenser discharge is sent through the electrodes and through the metal forming intersections 24 of the aligned grids.

This causes a fusion of all of the metal at the aligned intersections and a resultant welded aligned mass of the electrically conductive metal. This is shown at 38 in FIG. 5.

Once the matrix has been formed in the aforesaid manner it is then electrically connected to any external device for which the circuitry has been designed. This connection can be through soldering, welding or any other connecting means known to the art. As will be explained hereinafter, the external electrical connection can be accomplished at the same time as the interconnectors 10 are joined in the matrix.

In one embodiment of this invention, the matrix 12 can be united to a connector such as that shown at 14 in FIG. 1. As seen in FIG. 1, connector 14 includes an insulating housing 40 having a plurality of spaced cavities 42 projecting upwardly from the bottom thereof. Each cavity contains a contact 44 therein. Connector 14 further includes an insulating sheet 46 having a plurality of contacts 48 projecting upwardly therefrom. Contacts 48 are rotated to be 90° out of phase with contacts 44. The spacing of contacts 48 is the same as that of contacts 44. Thus, the series of contacts 44 can be united with the series of contacts 48 by placing the two together.

An exemplary embodiment for contact 44 is shown in FIG. 3. This contact 44 comprises a body section 50 and a tail section 52. Body section 50 includes a pair of spaced legs 54 having inwardly bevelled front edges 56 to facilitate the joinder with contacts 48. Each leg 54 includes an inwardly facing edge 58 and tapering edges 60 projecting downwardly and outwardly therefrom. Tail section 52 includes a pair of partially severed tabs 62.

In FIG. 3, contact 44 is shown as being secured to an insulating plate 64. The securement is obtained by passing the tail section 52 through a hole 66 in plate 64 and swaging the contact in place by forcing partially severed tabs 62 downward against the top of the plate. The securement of the contacts 44 to housing 40 is also through the same swaging operation. The contacts 44 and 48 are mated by forcing them together with the two being 90° out of phase. During this mating, the tapering edges 60 of contact 44 will slidingly contact and abut similar edges on contact 48 in a method well known to the art.

Although a specific connector has been shown it is to be understood that any connector known to the art can be used in combination with the electrical interconnector and matrix of this invention. Thus, in place of having an insulating plate 64 or a series of insulating housings 40, a metal plate carrying the contacts can be used. In this case, the contacts would be insulated from the metal plate by plastic or other non-conductive bushings. Rather than swaging the contacts in place, they could be maintained in place by the use of eccentric members on the tails, such as those disclosed in co-pending application Ser. No. 358,446, filed Apr. 9, 1964 and entitled "Miniature Contact." In all of these cases, the contact tails will project outwardly from the back of the panel or insulating housing holding the contacts. Thus, the connection with the circuitry of matrix 12 or interconnector 10 will be through these tails, as is typical of all back-panel wiring.

Figure 6:
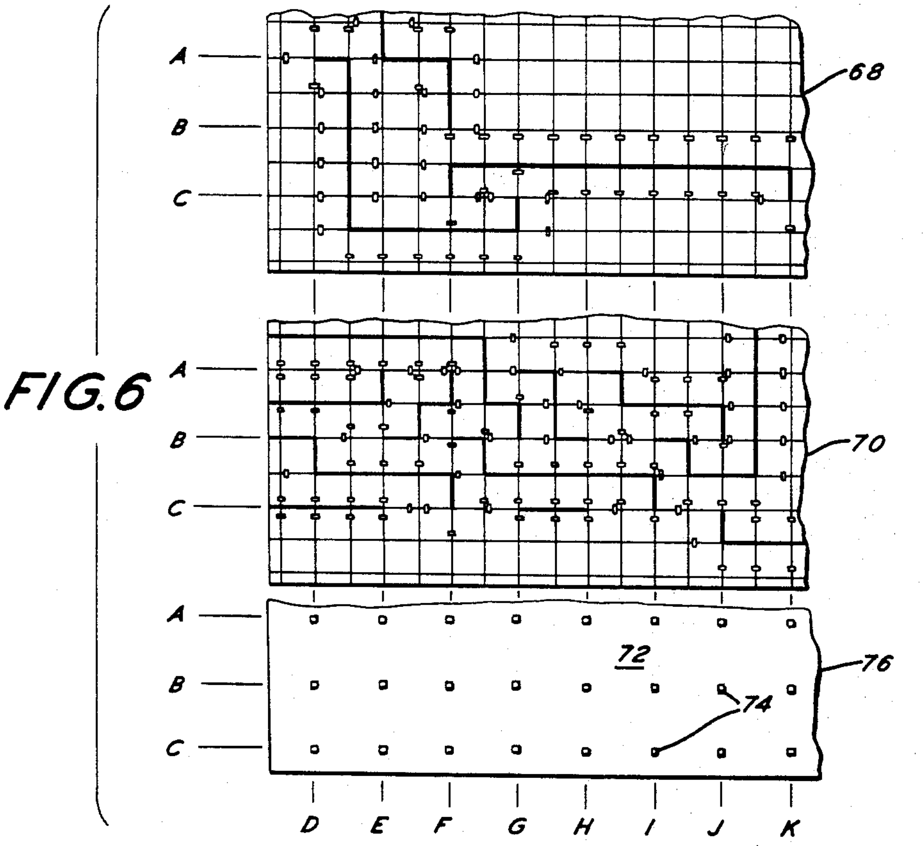
FIG. 6 is an exploded plan view of a method used for programming the deletion of unneeded portions of a plurality of electrical interconnectors to form a matrix which will give the desired circuitry.

As previously pointed out, the circuitry on each interconnector 10 is delineated through the use of punched holes. As seen in FIG. 2, the punching in one interconnector 10 is normally not the same as the next adjacent interconnector. Thus, a hole 28 formed in one interconnector need not be present in the next lower interconnector. As also pointed out above, when a series of identical circuits are to be formed in any one interconnector or in a group of interconnectors forming a matrix, the most convenient manner of deleting portions to form a circuit is through the use of a programmed gang press. The most efficient manner of arriving at the program for the press is to schematically illustrate all of the connectors forming the matrix on a chart. In FIG. 6, a first interconnector 10 is graphically shown on chart 68 and a second interconnector 10 is shown on a chart 70. A panel 72 having a plurality of contact tails 74 is graphically shown on chart 76. Although only two interconnector charts have been shown, it should be understood that as many interconnectors as there are forming a matrix can be shown by a separate chart for each. If desired, the various horizontal lines of each chart can be designated by the lines A, B, C, etc. and the various vertical lines can be designated by subsequently lettered lines such as D, E, F, etc. Each line A, B, C, etc. and D, E, F, etc. will correspond to a conductive line in grid 18. For ease of convenience in plotting, intermediate lines have been shown between lines A and B, B and C, etc.

In use, assuming there is to be a connection between point A–D and point C–G in chart 68, a line connecting these two points is graphically drawn. Thereafter, all of the portions which must be deleted can be shown on the chart. If it weren't for the presence of the intermediate lines, confusion would result as is apparent from the fact that there is a separate circuit to be shown at point C–F which would interrupt a line passing down the C line in going from point A–D to point C–G. Similar circuitry is also shown on chart 70. By the use of the charts in the aligned position shown in FIG. 6, it becomes obvious what circuits may be interfered with when all of the interconnectors of a matrix are welded. Likewise, using the charts, it is possible to have circuitry on more than one interconnector in a matrix which will be electrically joined during the welding operation. Furthermore, through the use of the charts, not only is it possible to program which holes are to be made in each interconnector, but it is also possible to determine which group of depressions 26 must be subsequently welded.

By way of example, it is seen on charts 68 and 70 that a weld must be formed in the series of depressions at bands A–D. There should be no electrical connection formed on the interconnector 10 corresponding to chart 70. The point A–D on the interconnector corresponding to chart 70 need not be physically removed. All that is necessary is that point A–D be electrically isolated by punching the four holes indicated in FIG. 6. A circuit will be formed on the interconnectors corresponding to charts 68 and 70 at the point C–G. Thus this circuit will appear on at least two of the interconnectors.

Once all of the deletions have been graphically shown and it has been decided that the most efficient use of space has been accomplished through the graphic representations, the gang punch can then be programmed. Thus, there will be a punching element for every deletion shown on a chart for a given interconnector. The punching thus becomes a relatively simple matter once the program has been completed since the same punching program can be used for an infinite number of identical circuits. Furthermore, the program will also determine the points at which the melting and welding electrodes will be positioned for the final back-panel wiring for the final circuitry of the complete matrix.

Although the grid 18 has been shown with the parallel bands intersecting at right angles, it is to be understood that the specific angles of intersection can be varied while still maintaining the function of the grid. The right angle configuration is preferred because it is readily adaptable to the charting shown in FIG. 6.

The preferred use of the matrix of this invention is in back-panel wiring. The most convenient manner of securing the contact tails to the matrix is through welding. When using the heating and welding technique described above, it is possible to weld the contact tails 52 to the welded grids 38 simultaneously with the welding of the grids. To accomplish this, only one electrode is used, which electrode is placed in the uppermost depression 26. The other electrode is formed by the contact 44 which is either grounded or maintained at a potential which is different from the upper electrode. Where there is no contact present, the electrodes will fuse the copper in the matrix at a given set of depressions. If this fused copper is not to form any portion of a circuit, it can easily be eliminated through the use of suitably punched holes. The use of the electrodes can be such as to either have an electrode for every depression, whereby the depressions forming unwanted circuitry can be punched out, or to program the electrodes such that they will be present only wherever circuitry is to be terminated.

Any size grid spacing can be used while carrying out this invention. Normally, the smallest line width would be 10 mils and the distance between lines would be 10 mils. This could be increased up to any desired proportions. Whenever the matrix is to be used for back-panel wiring, the spacing of the depressions 26 would be identical to the spacing of the contact tails in their respective housings or on their respective carrier plates. This further insures proper alignment and satisfactory electrical connection.

Obviously many modifications and variations of the present invention are possible in the light of the above teachings. It is, therefore, to be understood that within the scope of the appended claims, the invention may be practiced otherwise than as specifically described.

What is claimed as the invention is:

1. A matrix of electrical circuits comprising a plurality of stacked electrical interconnectors, each electrical interconnector comprising a sheet of insulating material, said sheet having a conductive grid on one surface thereof, said electrical interconnectors being stacked with said conductive grids of each of said interconnectors being separated from each other by said sheets of insulation material, said grid comprising a first plurality of parallel longitudinal conductors passing in a first direction, and a second plurality of longitudinal conductors passing in a second direction and intersecting said first plurality of conductors whereby an electrical junction is formed at each intersection, a plurality of breaks formed in the conductors of each electrical interconnector for delineating individual circuits, means securing said electrical interconnectors together to maintain the matrix in a set orientation, and at least two of said grids in said matrix being electrically interconnected by a bonded junction between said at least two of said grids at vertically aligned intersections of the conductors of each of said grids which are to be electrically interconnected.

2. The matrix of claim 1 wherein each of said breaks comprises a hole formed in said grid.

3. The matrix of claim 2 wherein said holes additionally pass through the associated sheet of insulating material.

4. The matrix of claim 1 wherein said sheet of insulating material comprises a thermoplastic resin, and said securing means comprising a fused aligned mass of said thermoplastic resin.

5. The matrix of claim 1 wherein a single electrical circuit is formed through at least two of said electrical interconnectors.

6. The matrix of claim 1 and further including aligning means on each electrical interconnector which maintain the orientation of one electrical interconnector to its next adjacent electrical interconnector.

7. The matrix of claim 6 wherein said aligning means comprises a plurality of depressions and projections on each electrical interconnector, the depressions of one interconnector mating with the projections of an adjacent interconnector, said depressions and projections being formed at the intersections of said first and second plurality of parallel conductors of each electrical interconnector, the depressions being on one side of said interconnector and the projections being on the other side of said interconnector.

References Cited

UNITED STATES PATENTS

| | | | |
|---|---|---|---|
| 3,038,105 | 6/1962 | Brownfield | 174—68 |
| 3,072,734 | 1/1963 | Fox et al. | 174—68 |
| 3,083,261 | 3/1963 | Francis et al. | 317—101 |
| 3,142,112 | 7/1964 | Burkig et al. | 174—68 |

DARRELL L. CLAY, *Primary Examiner.*